United States Patent [19]

Paeglis et al.

[11] Patent Number: 4,737,213

[45] Date of Patent: Apr. 12, 1988

[54] METHOD FOR HEAT SEALING THERMOPLASTIC MEMBRANES

[75] Inventors: Arnis U. Paeglis, Derby; Paul D. Hinckley, Woodbury, both of Conn.

[73] Assignee: Uniroyal Chemical Company, Inc., Middlebury, Conn.

[21] Appl. No.: 903,334

[22] Filed: Sep. 3, 1986

[51] Int. Cl.⁴ .................. B32B 31/04; B32B 31/20
[52] U.S. Cl. .................. 156/157; 156/323; 156/344; 156/497; 156/499; 156/544
[58] Field of Search .................. 156/157, 304.4, 323, 156/344, 497, 544, 547, 549, 550, 574, 577, 578, 579, 499

[56] References Cited

U.S. PATENT DOCUMENTS

| | | | |
|---|---|---|---|
| 3,962,017 | 6/1976 | Wyse | 156/323 |
| 4,048,277 | 9/1977 | Breznak et al. | 156/157 |
| 4,259,142 | 3/1981 | Kortepeter | 156/579 |
| 4,289,559 | 9/1981 | Murphy | 156/344 |
| 4,447,288 | 5/1984 | Seaman | 156/579 |
| 4,525,233 | 6/1985 | Brooks | 156/304.4 |

Primary Examiner—Caleb Weston
Attorney, Agent, or Firm—John A. Shedden

[57] ABSTRACT

A method for heat sealing a portion of an upper heat sealable thermoplastic membrane to a portion of a lower heat sealable thermoplastic membrane which comprises placing a detachable stabilizer strip on the outer surface of the upper membrane over the over-lap seam portions to be sealed. The stabilizer strip must fully adhere or have mechanical contact to retain the dimensional stability of the upper membrane while maintaining the relative positions of the membranes. A hot air medium is directed between the upper and lower membranes thereby effecting a heat seal therebetween. Once the overlapped and sealed portions of the membranes are permitted to cool, the stabilizer strip may be removed.

20 Claims, 2 Drawing Sheets

METHOD FOR HEAT SEALING THERMOPLASTIC MEMBRANES

BACKGROUND OF THE INVENTION

1. Field of the Invention

The present invention is directed to a method for sealing membranes, especially heat sealable thermoplastic membranes and, more particularly, to such a method whereby the seal between said membranes, especially heat sealable, thermoplastic membranes is effected by a hot air welding technique.

2. Description of the Prior Art

A recently emerging trend in the field of roofing is the displacement of the familiar built-up asphalt roofing with membrane roofing. Advantages of the new systems include ease of installation, a safer working environment for the applicator, greater resistance to cold cracking and longer term leak protection.

Another leading growth area is the utilization of ponds and pits for disposal of wastes of chemical plants, petroleum refineries, power plants and mining installations. To insure against seepage of aqueous wastes, liners must be provided. Thus, the development of pond and pit liners is a growing industrial concern.

Two membrane types, elastomeric and thermoplastic, are primarily utilized in this new technology. A leading elastomeric membrane is vulcanized EPDM while examples of thermoplastic membranes are plasticized PVC, chlorinated polyethylene (CPE) and chlorosulfonated polyethylene (CSPE).

Both membrane types have advantages and disadvantages. Vulcanized EPDM has outstanding resistance to outdoor weathering, good cold flexibility, high strength and excellent elongation characteristics. Its major disadvantage is the necessity of using adhesives for seaming the membrane to provide a continuous leak-free roof covering. Such adhesives are expensive and time-consuming to apply and are prone to delaminate under stressful conditions because of their low strength resulting in leakage at the delaminated sites. Plasticized PVC offers surer seams because the material, being thermoplastic, can either be heat sealed or solvent welded to give an integral seam of high strength. Such membranes, however, tend to lose plasticizer with time resulting in a short useful life and poor cold crack resistance.

In recent years, new classes of polymers have been developed which are based on chemically modified elastomers, especially saturated backbone elastomers such as EPDM and Butyl rubber. More specifically, the polymers are modified in such a way as to introduce an ionic group on the polymer. Thus, they may be referred to, in general, as "ionomers" or "ionic elastomers".

Among this new class of "ionomers" are sulfonated elastomers and carboxylated elastomers. These polymers are derived from polymeric materials having olefinic unsaturation, especially elastomeric polymers such as EPDM rubber. U.S. Pat. No. 3,642,728, incorporated herein by reference, teaches a method of selective sulfonation of olefinic unsaturation sites of an elastomeric polymer to form an acid form of a sulfonated elastomeric polymer. The olefinic sites of the elastomeric polymer are sulfonated by means of a complex of sulfur trioxide donor and a Lewis base. The $SO_3H$ groups of the sulfonated elastomer are readily neutralized with a basic material to form an ionically crosslinked elastomer having substantially improved physical properties over an unsulfonated elastomer at room temperature. However, these ionically crosslinked elastomers may be processed like a conventional thermoplastic at elevated temperatures under a shear force in the presence of selected preferential plasticizers which dissipate the ionic associations at the elevated temperatures thereby creating a reprocessable elastomer.

Further developments relating to "ionomers", i.e., the sulfonated polymers, are disclosed in U.S. Pat. Nos. 3,836,511; 4,222,914; 3,870,841; 3,847,854 and 4,157,992.

A second new class of elastomeric "ionomers" is the class of carboxylated elastomers. These polymers are derived from polymeric materials having olefinic unsaturation, especially elastomeric polymers such as EPDM. See, for example, U.S. Pat. No. 3,884,882 and 3,997,487, both of which are incorporated herein by reference.

Although these ionomers represent a significant development in the elastomeric arts, none of these advances have found application in the waterproof membrane arts. That is, none of the aforementioned disclosures explicitly suggest, implicitly imply, or otherwise make obvious their use in any application which requires a waterproof membrane, covering or the like wherein the membrane or covering requires long term exposure to the elements.

More recently, commonly assigned U.S. Pat. No. 4 480 062, incorporated herein by reference, discloses such a waterproof membrane comprising an elastomeric composition. Commonly assigned U.S. Pat. No. 4,589,804 incorporated herein by reference, also discloses the use of such a composition to waterproof a surface and the resultant roof formed thereby.

In general, such a waterproof membrane comprises an elastomeric sheet which includes a neutralized acid group containing elastomeric polymer, the neutralized acid group containing a cation selected from the group consisting of ammonium, antimony, aluminum, iron, lead and a metal of Groups IA, IIA, IB, or IIB of the Periodic Table of Elements and mixtures thereof. The sheet may also include a non-polar process oil, carbon black and a preferential plasticizer.

Examples of preferential plasticizers are selected from the group consisting of a basic salt of carboxylic acid having 2 to 30 carbon atoms. The salt contains a cation selected from the group consisting of antimony, aluminum, iron, lead, a metal of Group IA, IIA, IB, or IIB of the Periodic Table of Elements and mixtures thereof and an organic amide having the formula $R^1CONR^2R^3$ where $R^1$ is an aliphatic group and $R^2$ and $R^3$ are the same or different and are hydrogen, alkyl, aryl, aralkyl or the group $-CH_2CH_2NHCOR^1$, and where at least one of $R^1$, $R^2$ and $R^3$ has at least 5 carbon atoms.

Elastomeric polymers which can be used in the composition include EPDM, Butyl rubber, thermoplastic polyolefins and the like.

Other additives can be added to the composition such as antioxidants, fillers and the like. Other nonessential features of the elastomeric composition can be obtained from U.S. Pat. No. 4,589,804.

The foregoing references are illustrative of the different types of compositions which can or cannot be calendered or extruded to form waterproof coverings or membranes.

The present invention relates to a new method for sealing membranes that are heat-activatably bondable, particularly for heat sealing heat sealable materials by hot air welding, whether they be in the form of sheets, membranes, film, etc. Thus, in a broad sense the term "heat seal" means the process wherein at least a portion of two membranes, at least one of which has a heat-activatably bondable surface, are permanently affixed together either by the use of hot air alone which causes the overlapped surface of at least one of the two membranes to soften and fuse i.e., self-seal or by the use of hot air impinging upon heat-activated adhesive means positioned between said portion of two membranes to soften and render effective said adhesive means. By the term "heat activatably bondable" where applied to a surface is meant a surface that is thermoplastic and therefore capable of fusing at elevated temperatures or one that has some adhesive means affixed thereto that is rendered effective or activated by elevated temperatures. The term "membrane" as used herein is meant to include films and/or sheets which are capable of being heat sealed.

One of the principal applications of the above discussed membranes is as a roof covering. The types of roof which may be covered by such membranes are flat or sloped roofs and may comprise new or retrofitted roof installations. The type of roof surface which may be covered by such membranes, often referred to as the roof deck, may be wood, cement, metal, concrete or combinations thereof. In addition, such membranes may also be affixed to insulation which may be disposed over the aforementioned roof decks. Insulation such as wood fiberboard, expanded polystyrene, fiberglass board and rigid polyurethane board may be covered with the unreinforced membranes of this invention. In installing the roof covering, the covering may be fully bonded to the roof surface, spot or partially bonded to the roof surface, loose laid and ballasted, or mechanically bonded by methods such as battens, discs or buttons.

In addition, such membranes may also be employed as roof flashing, cover roof protrusions, drains, gutters, outlets, edge trims, parapet wall terminations, corners and other roof details.

In general, the aforementioned membranes can be seamed together by various techniques, including heat sealing, solvent welding, adhesive bonding and elastomeric adhesive tape bonding, or combinations thereof. The method of the present invention is, however, particularly effective and therefore especially directed to a hot air welding technique for heat sealing. In this technique, the membranes or panels are normally "lap-seamed" to create a "lap-seam assembly" which provides the large required panel sizes necessary for roof coverings, pond liners and the like.

In a preferred embodiment of this invention, the actual lap-seaming of the membranes is effected by hot air welding which provides a high strength integral bond without the introduction of any foreign material. This is accomplished by providing a lap-seam assembly where the membranes meet and directing a hot air flow between the laps from a hot air gun followed by a pressure roller along the top of the seam. Unfortunately, however, when utilizing such a hot air gun roller, various problems can arise when attempting to seal the panels together. When the top sheet is heated to fusion temperatures, the top sheet softens and thermally expands in front of the hot air gun roller. This expansion is particularly noticeable with unreinforced membranes. This expansion causes the membrane material to build up in advance of the roller, until it finally folds or distorts and passes beneath the pressure roller wheels. This produces an aesthetically unpleasing finished product which may have a fold every few feet on the seam. More significantly, such folds serve as a possible source of leakage.

It is therefore an object of the present invention to provide a method of joining together unreinforced sheets or membranes, especially heat sealable, thermoplastic sheets or membranes.

It is a further object of the present invention to provide a method for sealing together lapped edge portions of sheets or membranes without distorting the edge portions of the membranes.

It is still a further object of the present invention to provide a method of sealing unreinforced membranes by the hot air technique especially of heat sealing by the hot air welding technique, heat sealable, unreinforced thermoplastic sheets or membranes such that the resultant seal is devoid of any wrinkles and/or billowing effects.

It is yet a further object of the present invention to provide such a method of sealing with or without adhesive means, such that the resultant seal created maintains its waterproof qualities over extended periods of time.

These and other objects of the present invention will become apparent to those skilled in the art.

BRIEF SUMMARY OF THE INVENTION

Broadly contemplated, there is provided a method for sealing at least two membranes together, especially heat sealable thermoplastic membranes by a hot air technique wherein a portion of one of the membranes is positioned over a portion of the other membrane thereby creating a lap-seam assembly. A stabilizing strip is then detachably affixed to the top or first sheet of the lap-seam assembly, i.e., over that portion of the membranes to be sealed together, providing dimensional integrity to and eliminating sheet distortion of the top sheet and also essentially maintaining the relative position of the portions of the membranes to each other during the heat seaming step. A hot air medium is then directed between the membranes so as to heat the membranes internal, contact surfaces to a temperature at least as high as the fusion temperature of the heat sealable membranes or the adhesive activation temperature followed by application of pressure on the top sheet by a roller so as to create a seal therebetween. The membranes are then allowed to cool at which time the stabilizing strip can be removed.

DESCRIPTION OF THE PREFERRED EMBODIMENT

Figure 1:
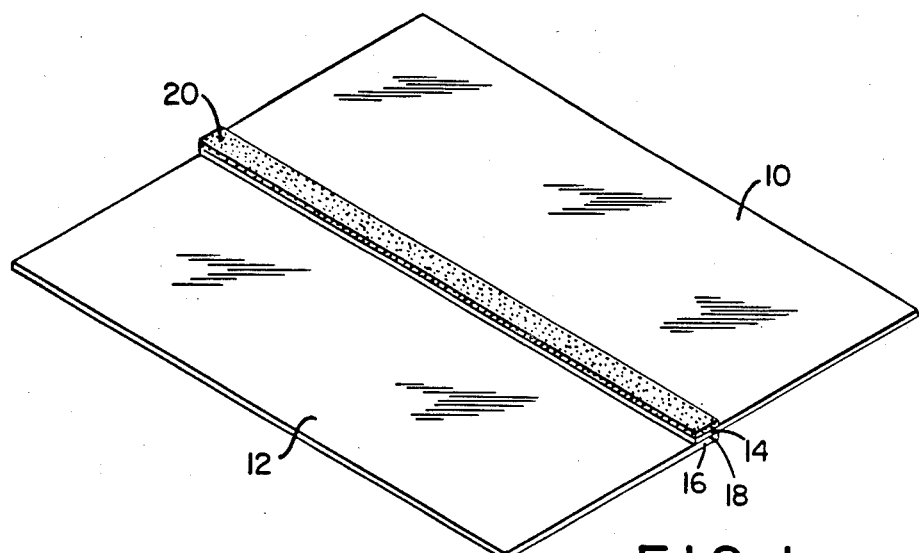
FIG. 1 is a perspective view of two heat sealable sheets or membranes having overlapped edges (lap-seam assembly) which are in contact with the detachable stabilizer strip of the instant invention.

Referring particularly to FIG. 1 of the drawing, two heat sealable, thermoplastic membranes 10,12 are disposed in partial juxtaposition with the side edge 14 of an upper or first membrane 10 overlapping the side edge 16 of a lower or second membrane 12 to form a "lap-seam" or "lap-seam assembly" 18 therebetween. As mentioned previously, the membranes or sheets 10,12 can be fabricated from a variety of compositions which can be extruded or calendered to form heat sealable films, sheets or membranes, and which are susceptible to thermal expansion, edge deformation and folding when subjected to heat sealing by conventional hot air welders. Although the membranes 10,12 are shown as being unreinforced, they can be of the reinforced type, i.e., possessing one or more plies of reinforcing sheet(s) of fabric, woven or nonwoven, paper or metal foil.

Referring again to FIG. 1, after the membranes 10 and 12 are so positioned to form lap-seam assembly 18, a detachable, non-heat sealable, stabilizing strip 20 is provided over the length of the lap-seam assembly 18. The stabilizing strip 20, which is detachably affixed to or in intimate physical contact with the upper or first membrane is provided over a portion, preferably the entire width, of the lap-seam assembly 18. The lower or second membrane 12 may be fixed to the roof on which it is being applied (not shown) by suitable affixation means, such as fully adhering, spot bonding, mechanical attachments and the like. The upper or first membrane 10 can be fixed or be free floating.

It will also be appreciated that the method of the present invention can also be used for effecting lamination of two fully juxtaposed layers.

The material used for stabilizing strip 20 must be able to maintain the dimensional stability of the membrane portion to which it is affixed when the membrane is heated from an external hot air generating device. For this purpose, it has been found that a tape with an adhesive backing such as, for example, masking tape, is particularly effective since it can be temporarily fully adhered to lap-seam 18 prior to sealing and still serve to essentially maintain the relative positions of the membranes 10,12 and the dimensional stability of the upper membrane during the sealing of the lap-seam 18.

Other suitable materials which can be used for the stabilizing strip 10 include an adhesive or roughened track or belt optionally having protrusions or projections thereon, and which provides contact points for securing the underlying material. It is important for the stabilizing strip to have enough physical or mechanical contact throughout to maintain the dimensional stability of the upper membrane. The stabilizer strip 20 preferably should be of a width sufficient to cover the lap-seam 18 and more preferably, should be sufficiently wide to accommodate any hot air generating device employed. Sealing is effected by the application of heat between the membranes and pressure over the stabilizer strip 20 from an external source, preferably in the form of a roller or the like. After sealing, the membranes 10,12 are permitted to cool and the stabilizer strip 20 is removed to expose the welded or adhered seam.

As mentioned previously, the present method is directed to heat or adhesive sealing by hot air techniques. It will, of course, be appreciated that various types of equipment may be used to accomplish the purpose. In general, such apparatus must have a heat generating source and be capable of delivering the air under conditions sufficient to seal the desired surfaces. A particularly suitable type of hot air apparatus is the LEISTER VARIANT (Trademark) hot air welding tool available from BRIAN R. WHITE Co., Inc., Ukiah, Calif., and which includes roller means which compresses the area to be sealed after the delivery of the heated air to the heat sealable surfaces.

Figure 2:
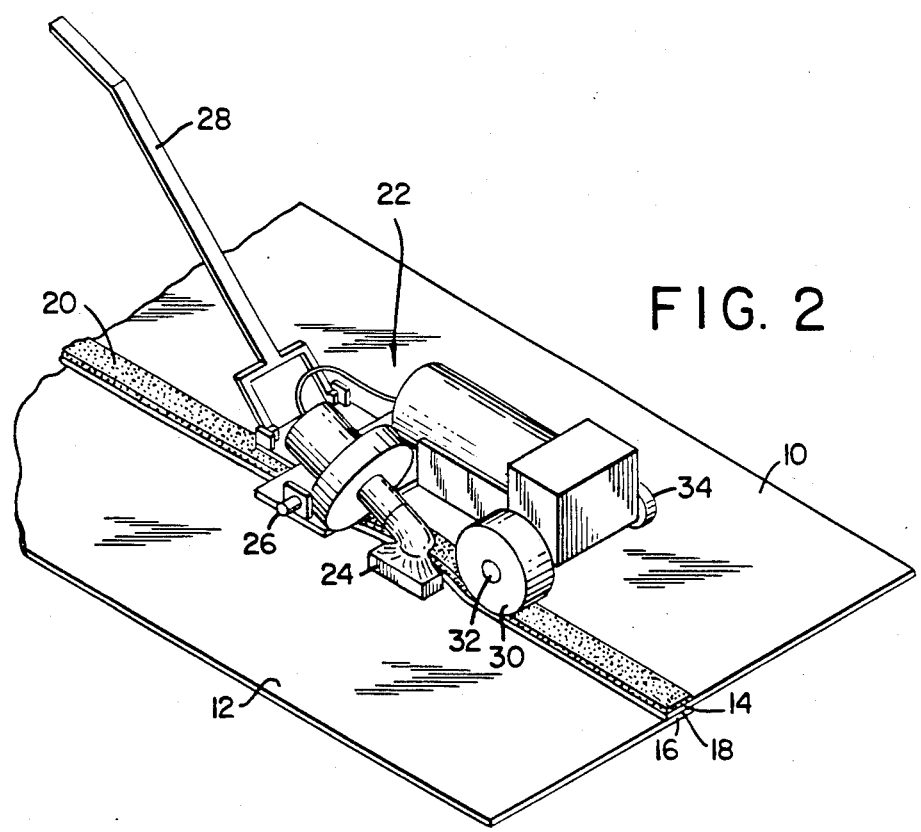
FIG. 2 is a perspective view showing a hot air welding tool positioned over the detachable stabilizer strip during a hot air welding process. A nozzle directs hot air in-between the sheets to be heat welded.
Figure 3:
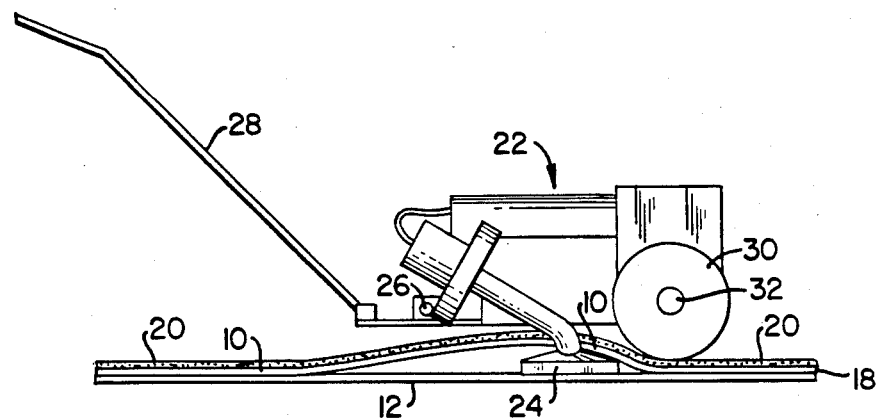
FIG. 3 is a side elevational view of the hot air welding tool relative to the membranes to be welded together.

The use of such a piece of equipment is illustrated in FIGS. 2 and 3 which show, in general, a hot air welding tool 22 in position over a barrier strip 20, i.e., masking tape. Welding tool 22 is provided with an air nozzle 24 which delivers heated air between the lap-seam surfaces of the membranes to be sealed. The air delivery nozzle 24 is maintained at a predetermined depth into the lap-seam and height above the lower membrane and can be adjusted about pivot point 26. The delivery nozzle 24 is provided with discharge orifices (not shown) which can deliver the type, i.e., volume and direction, or hot air delivery required.

The welding tool 22 can be automatically moved along the lap-seam 18 between the two membranes 10,12 as shown in FIG. 2 by means of a variable speed electric motor coupled to a drive mechanism. At least one compressor roller 30 which is rotatably mounted on housing 32 is provided adjacent to the air nozzle 24, which serves to compress the heat sealable site after heating. For purpose of leverage and position, the welding tool 22 may also include a second roller 34 (not shown in FIG. 3).

Figure 4:
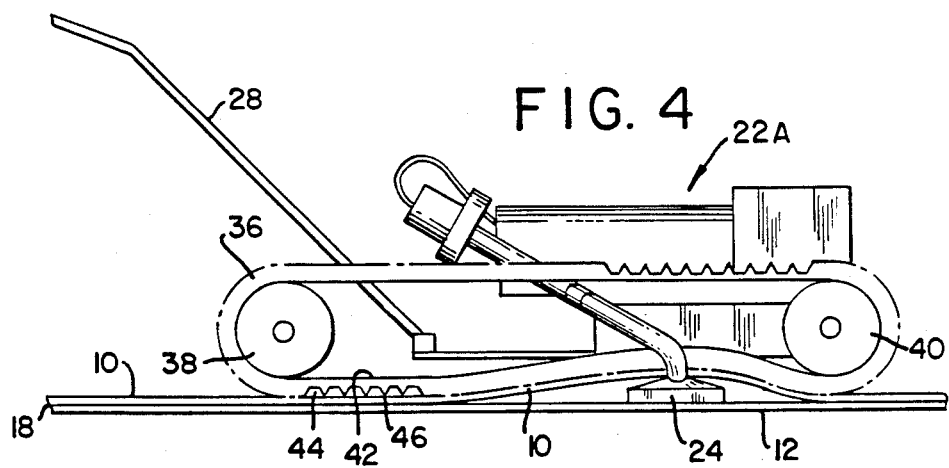
FIG. 4 shows an alternate embodiment wherein the detachable stabilizer strip is in the form of an endless belt associated with the hot air welding tool.

FIG. 4 illustrates an alternate embodiment of the welding tool 22A illustrated in FIGS. 2-3 with like parts being represented by like reference numerals. In this embodiment, the stabilizer strip 20 is provided in the form of an endless belt 36 which passes around rollers 38,40. By utilization of this type of apparatus, the hot air nozzle delivers hot air between the lap-seam edges of the membrane, the top membrane stabilized by the portion 42 of endless belt 36. The endless belt 36 may be fabricated from a non-heat sealable material and may include cut out grooves 44 which define peak contacting areas 46 which contact the lap-seam 18. These peak contacting areas 46 serve to mechanically preven migration of the edge portions of lap-seam 18.

As the material is heat sealed and the welding tool 22A is urged lengthwise along lap-seam 18 the material cools and the endless belt 36 continues to rotate out of contact with the lap-seam 18. Although not shown, rather than grooves, the belt can be provided with protusions which contact the surface of the membranes. In such an embodiment, there is no need to first position a stabilizer strip and thereupon remove the strip after heat sealing as in the first embodiment, since the endless belt functions as the stabilizer strip during operation.

The following examples will further illustrate the present invention.

EXAMPLE 1

This example illustrates an attempt to heat seal, heat sealable thermoplastic membranes without the use of a stabilizer strip as provided for in accordance with the process of the present invention.

Eight rolls of an ionic elastomer heat sealable roof membrane five feet wide were installed on a 5,000 sq. ft. flat roof. The membrane was also applied to weatherproof the parapet walls. The ionic elastomer used was 45 mils thick. The membrane was fully adhered onto 1.0 inch thick fiberboard insulation which was securely anchored into the metal roof deck.

A LEISTER VARIANT automatic hot air welder was employed. By using the hot air welder, the membranes were fused together at the point of the overlap seam.

The results of this experiment were commercially unsatisfactory. The main problem was the fact that not a single full length heat seam was created without some wrinkles or flaws. These problems were primarily due to the fact that the top sheet distorted from heat and mechanical action and was pulled and/or dragged at the seam overlap. Additionally, when the bottom membrane was securely anchored, it could not move to compensate for the distortion in the top membrane. These folds were aesthetically displeasing and, moreover, were potential sites for leaks or other failures.

EXAMPLE 2

The procedure recited in Example 1 was substantially followed. In this instance, however, the lower ionic elastomeric membrane was not adhered to the wood fiberboard insulation. This method of application was tested in an attempt to circumvent the problems observed in Example 1, particularly the wrinkles and distortion of the top membrane which could result in leakage. The problems in seaming loosely laid membranes were not as prevalent as when the sheet was fully adhered or secured. However, complications were nevertheless, experienced and such complications were similar in nature. Most of the complications related to the differential movement or distortion of the top membrane compared to the bottom membrane. In sum, these compilations included, but were not limited to, thermal expansion of the membrane, distortion of the top membrane by high air velocity, entrapment of a wave in the top membrane by the air dam, distortion of the membranes caused by the frictional drag of the heating nozzle, a gathering or bunching of the membrane caused by running the hot air welder on the top of the membrane, the non-uniform shrinkage and relaxation of the membrane orientation, the gathering of the top membrane and unbalanced tracking due to the tapered, increased outside diameter of the stitching wheel.

EXAMPLE 3

This example illustrates an attempt to heat seal heat weldable thermoplastic membrane using another conventional roofing membrane attachment method, but without the use of a stabilization strip as provided for in accordance with the process of the present invention.

The procedure recited in Example 1 was again substantially followed. In this instance, four rolls of an ionic elastomer heat sealable roof membrane six feet wide were installed on a 3,600 sq. ft. flat roof. The ionic elastomer membrane used was 50 mils thick. In this instance, the membrane was not fully adhered onto the insulation, 1 inch thick wood fiberboard, but was mechanically attached using a batten strip. Before the seams were heat welded, the outer edges of the lower membrane of an overlap seam were mechanically attached through the insulation and into the deck using fifty foot long sections of 1 inch wide 20 gauge metal batten strips secured into the roof deck with screws every 6 inches through perforated holes in the strip. The adjacent upper membrane of an overlap seam was seamed together so that the batten strip was situated under the upper membrane and inside the overlap seam, thus protecting the batten from the elements. The overlap seams were fused together using the hot air welder.

Again, the results of this experiment were commercially unsatisfactory. The problems that occurred were similar or identical to those described in Examples 1 and 2.

EXAMPLE 4

This example illustrates a further attempt to heat seal heat weldable thermoplastic membrane using a modification of the LEISTER VARIANT automatic hot air welder.

The hot air welder was modified to run on the lower membrane of an overlap seam. The welder was further modified by using a reverse outside configuration nozzle and an extended stitching wheel. Further modifications included the use of a weighted outrigger air dam modified for the welder using small idler wheels to compress the upper membrane to the lower membrane at a set distance from the upper membrane edge to limit the depth of hot air penetration which further enhanced seaming ease and quality.

The procedure recited in Example 3 was substantially followed. The results of these modifications were a slight improvement, but were, nonetheless, commercially unacceptable. The incidence of wrinkles and flaws decreased, but there was not a single full length heat seam without some wrinkle or flaw. Again, these problems were primarily due to mechanical and heat distortions of the top sheet. Such folds and wrinkles were potential sites for leaks and failures and were also aesthetically displeasing.

EXAMPLES 5, 6, 7 AND 8

The same procedures as were recited in Examples 1, 2, 3 and 4 were again substantially followed with the exception that the procedures similar to Examples 1 and 2 were carried out on 1,500 to 7,000 sq. ft. roofs over various types of insulation. The membranes were situated as in the previous examples in such a manner as to create an unadhered overlap therebetween. Seam quality was maintained throughout the processes by detachably adhering a 2-inch strip of masking tape along the entire seam overlap by applying it to the top surface of the top membranes and thereafter the flat overlap seams were subjected to the hot air insertion. The masking tape served to stiffen the upper membranes at the lap-seam assembly as the hot air fused the membranes together. After cooling, the masking tape was removed to reveal heat sealed seams free of wrinkles and/or billows and which were aesthetically pleasing to the eye. After further observation, the seams which were formed were found to be waterproof.

EXAMPLE 7

A further modification of the hot air welder served to improve seaming quality when using the tape drive method. In particular, a weighted brass plate with idler wheels was set close to and outside the pressure wheel of the device as an outrigger such that the idling wheels were permitted to run on the 2 inch masking tape which compressed the two membranes together, the compress loci serving as an air dam to prevent the hot air from blowing past the seam overlap area and the result was a reduction in drag and improved heating efficiency. After removal of the masking tape, the revealed heat sealed seam was again free of wrinkles. There was no billowing effect either during the heat sealing process or after the resulting seam was formed. Moreover, not only were these heat sealed seams aesthetically pleasing, after further testing, the seams were found to be waterproof.

The aforementioned preferred embodiments and examples are given to illustrate the scope and spirit of the instant invention.

These embodiments and examples will make apparent to those skilled in the art other embodiments and examples within the scope of this invention. These other embodiments and examples are within the contemplation of the present invention. Thus, the instant invention should be limited only to the appended claims.

What is claimed is:

1. A method for heat sealing a first supported, unreinforced membrane having an inner surface and an outer surface to a second unsupported, unreinforced membrane having an inner surface and an outer surface wherein at least a portion of one of said inner surfaces is heat-activatably bondable, said method comprising the steps of sequentially:
    (a) positioning the membranes such that at least a portion of the inner surface of said second membrane overlaps at least a portion of the inner surface of said first membrane, at least one of said membranes having a portion of said inner surface in said overlap heat activatably bondable, thrby forming a lap-seam assembly having two outer surfaces, the outer surface of said first membrane being supported, and two inner surfaces;
    (b) detachably affixing a stabilizer strip over at least a portion of the outer surface of said second unsupported membrane on said lap-seam assembly;
    (c) directing hot air between the inner surfaces of said lap-seam assembly, thereby activating the heat-activatably bondable portion of at least one inner surface of said lap-seam assembly;
    (d) applying pressure to said stabilizer strip thereby affecting a seal between the inner surfaces of said lap-seam assembly; and
    (e) detaching said stabilizer strip.

2. A method for heat sealing a first supported, unreinforced heat sealable, thermo-plastic membrane having an inner surface and an outer surface to a second unsupported, unreinforced heat sealable, thermoplastic membrane having an inner and an outer surface by hot air welding, said method comprising the sequential steps of:
    (a) positioning the membranes such that at least a portion of the inner surface of said first membrane overlaps at least a portion of the inner surface of said second membrane, thereby forming a lap-seam assembly having two outer surfaces, the outer surface of said first membrane being supported, and two inner surfaces;
    (b) detachably affixing a stabilizer strip over at least a portion of the outer surface of said second unsupported membrane on said lap-seam assembly;
    (c) directing hot air between the inner surfaces of said lap-seam assembly so as to heat the inner surfaces of said lap-seam assembly to a temperature at least as high as their fusion temperatures;
    (d) applying pressure to said stabilizer strip thereby affecting a seal between the inner surfaces of said lap-seam assembly; and
    (e) detaching said stabilizer strip.

3. The method according to claim 2, wherein at least one of said membranes is composed of an elastomeric composition comprising:
    a neutralized acid group containing elastomeric polymer, said neutralized acid group containing a cation selected from the group consisting of ammonium, antimony, aluminum, iron, lead and a metal of Group IA, IIA, IB, or IIB of the Periodic Table of Elements and mixtures thereof;
    a non-polar process oil;
    carbon black; and
    a preferential plasticizer.

4. The method according to claim 3, wherein said detachable barrier strip is adhesive tape.

5. The method according to claim 4, wherein said adhesive tape is masking tape.

6. The method according to claim 2, wherein said detachable stabilizer strip comprises an endless belt associated with the apparatus used to provide the hot air.

7. The method according to claim 2, wherein at least one of said membranes is reinforced.

8. The method according to claim 7, wherein said reinforced membrane includes at least one ply of woven fabric.

9. The method according to claim 7, wherein said reinforced membrane includes at least one ply of non-woven fabric.

10. The method according to claim 7, wherein said reinforced membrane includes at least one ply of paper.

11. The method according to claim 7, wherein said reinforced membrane includes at least one ply of metal foil.

12. The method according to claim 2, wherein at least one of said thermoplastic membranes is an ionic elastomer.

13. The method according to claim 2, wherein at least one of said thermoplastic membranes is composed of a composition comprising a thermoplastic EPDM.

14. The method according to claim 2, wherein at least one of said thermoplastic membranes is composed of a composition comprising thermoplastic butyl rubber.

15. The method according to claim 2, wherein at least one of said thermoplastic membranes is composed of a composition comprising a thermoplastic polyolefin.

16. The method according to claim 2, wherein at least one of said thermoplastic membranes is composed of a composition comprising thermoplastic polyvinylchloride.

17. The method according to claim 1, wherein said detachable barrier strip is adhesive tape.

18. The method according to claim 2, wherein said detachable barrier strip is adhesive tape.

19. The method according to claim 1, wherein said adhesive tape is masking tape.

20. The method according to claim 2, wherein said adhesive tape is masking tape.

* * * * *